(12) United States Patent
Takenaka

(10) Patent No.: US 6,623,878 B1
(45) Date of Patent: Sep. 23, 2003

(54) SINTERED FERRITE BODY AND LAMINATED FERRITE COMPONENT INCLUDING SAME

(75) Inventor: Kazuhiko Takenaka, Yokaichi (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 103 days.

(21) Appl. No.: 09/678,936

(22) Filed: Oct. 4, 2000

(30) Foreign Application Priority Data

Oct. 4, 1999 (JP) .......................................... 11-282580

(51) Int. Cl.$^7$ ................................................ B32B 9/00
(52) U.S. Cl. ................... 428/699; 428/701; 252/62.56; 264/345; 501/32
(58) Field of Search ................................ 428/426, 432, 428/457, 469, 688, 689, 702; 252/62.51, 62.56; 106/425; 501/32, 61, 76, 77; 264/345

(56) References Cited

U.S. PATENT DOCUMENTS 5,120,366 A * 6/1992 Harada et al.
5,476,728 A * 12/1995 Nakano et al. .......... 252/62.58
6,165,379 A * 12/2000 Kono
6,210,596 B1 * 4/2001 Takenaka et al.
6,362,716 B1 * 3/2002 Anbo et al. ................. 336/200

FOREIGN PATENT DOCUMENTS

DE 689 21 971 8/1995
JP 08-148338 6/1996

OTHER PUBLICATIONS

H. Scholze, "Natur, Struktur und Eigneschaften", Glas, Second Edition, Sprenger–Verlag (Publishing House), 1977, Chapter 3.6.1.2, PP. 240–246 (No month).

* cited by examiner

*Primary Examiner*—Deborah Jones
*Assistant Examiner*—Arden Sperty
(74) *Attorney, Agent, or Firm*—Keating & Bennett, LLP

(57) ABSTRACT

A sintered ferrite body is obtained by baking a raw ferrite material including about 0.1% to about 30% by weight of a glass having, as a single material, and having a specific resistance $\rho$ ($\Omega$) of about 10 or more in the log $\rho$ unit, and a softening point of about 400° C. to about 700° C., in order to overcome the problem that relatively low specific resistance of a ferrite material causes insulation deterioration as well as migration of an internal electrode in a laminated ferrite component when constructing the laminated ferrite component from a sintered ferrite body.

25 Claims, No Drawings

SINTERED FERRITE BODY AND LAMINATED FERRITE COMPONENT INCLUDING SAME

BACKGROUND OF THE INVENTION

1. Field of the Invention

The present invention relates to a sintered ferrite body. More specifically, the present invention relates to a sintered ferrite body to be included as a main body in a laminated ferrite component with an internal conductor provided therein, and to a laminated ferrite component including such a sintered ferrite body.

2. Description of the Related Art

A sintered ferrite body is used as a main body of a laminated ferrite component such as a laminated inductor array, a laminated LC complex noise filter, a laminated LC complex noise filter array, or a laminated common mode choke coil. An internal conductor is provided inside of the main body. Silver or an alloy including silver is often used as an electroconductive component contained in the internal conductor.

When constructing a main body for a laminated ferrite component with the above-described sintered ferrite body, baking at a relatively high temperature must be performed in the baking step for obtaining a sintered ferrite body in order to fully achieve desired electrical characteristics that the sintered ferrite body can inherently provide. However, when a silver-containing internal conductor is formed as described above, baking at such a high temperature will allow the silver contained in the internal conductor to diffuse into the ferrite portion, with the result that the electrical properties of the laminated ferrite component are be deteriorated.

A conventional attempt to solve this problem has involved adding glass to a ferrite. Glass acts as an adjuvant in sintering and has an ability to decrease the sintering temperature of a ferrite. Accordingly, addition of glass makes it possible to perform the baking of a ferrite at a relatively low temperature by virtue of the decreased sintering temperature of the ferrite. As a result, the diffusion of silver into the ferrite portion can be prevented.

This conventional solution involving adding glass to a ferrite, for example, is disclosed in Japanese Unexamined Patent Application Publication 8-148338, which describes that a laminated chip inductor with a large inductance value and with a small variation in properties can be obtained by adding a borosilicate glass having a softening point of 600° C. or less to a raw ferrite material.

However, a ferrite in general has a relatively low specific resistance. Therefore, insulation deterioration and migration of an internal conductor occurs when a specific voltage is applied for a long time to the laminated ferrite component thus obtained.

Regarding the effects on inhibiting insulation deterioration and migration of an internal conductor as described above, it is not sufficient that a borosilicate glass that is added to a raw ferrite material has a softening point of 600° C. or less as described in Japanese Unexamined Patent Application Publication 8-148338.

On the other hand, it may be possible to add a large quantity of glass to a raw ferrite material in order to increase the specific resistance of a sintered ferrite body. However, in such a case, the shape required for a sintered ferrite body cannot be maintained, and properties inherent in a ferrite material are damaged during the baking step because of the softened glass.

SUMMARY OF THE INVENTION

In order to overcome the problems described above, preferred embodiments of the present invention provide a sintered ferrite body with a greatly improved specific resistance and other preferred embodiments provide a laminated ferrite component including such an improved sintered ferrite body in which insulation deterioration and migration in an internal conductor are prevented.

In order to overcome the above-described technical problems with conventional devices, various preferred embodiments of the present invention provide a sintered ferrite body with a glass portion located on the ferrite grain boundary. The body is obtained by baking a raw ferrite material and a glass which is added to the raw ferrite material, the content of the glass is about 0.1% by weight to about 30% by weight with respect to the raw ferrite material, and the glass has, as a single material, a specific resistance $\rho$ ($\Omega$) of about 10 or greater in the log $\rho$ unit, and a softening point of about 400° C. to about 700° C.

In a sintered ferrite body according to various preferred embodiments of the present invention, an Ni system, an Ni—Zn system, or an Ni—Cu—Zn system ferrite is preferably used as the ferrite material.

According to preferred embodiments of the present invention, a laminated ferrite component includes a sintered ferrite body having the characteristics as described above and an internal conductor disposed inside the body.

The present invention is particularly preferably applicable to a laminated ferrite component having an internal conductor including silver.

Other features, elements, characteristics and advantages of the present invention will become more apparent from detailed description of the preferred embodiments below.

DETAILED DESCRIPTION OF PREFERRED EMBODIMENTS

The sintered ferrite body according to various preferred embodiments of the present invention has a glass portion disposed on the ferrite grain boundary as described above.

As a main component, for example, an Ni system, an Ni—Zn system, or an Ni—Cu—Zn system ferrite is preferably used.

In order to form a glass portion on the ferrite grain boundary, a ferrite material as a main component is prepared, a glass powder is added in advance at a specific ratio to the main component and mixed, then the mixture is molded, and the baking step is performed. The above-described glass powder to be added is obtained such that elements for constituting the glass are compounded, and are melted into a vitrified material by a heat treatment, the vitrified material is pulverized.

Also, in order to have a laminated structure as in a laminated ferrite component, in which an internal conductor is formed inside the sintered ferrite body, a plurality of sheets are formed from a slurry including a raw ferrite material and a glass powder, followed by lamination of these sheets. Alternatively, printing is repeatedly performed with a paste containing a raw ferrite material and a glass powder. Another manufacturing method which is a press molding method can also be performed. In such a method, a conductor coil to be used as an internal conductor is placed in a mold, and a raw ferrite material and a glass powder are filled in the mold and pressed.

As an electroconductive component contained in the internal conductor, silver or an alloy containing silver such as a silver/palladium alloy is preferably used.

The glass to be added for obtaining a sintered ferrite body according to various preferred embodiments of the present invention has, as a single material, a specific resistance $\rho$ ($\Omega$) of about 10 or greater in the log $\rho$ unit. The reason for choosing the value of about 10 or greater in the log $\rho$ unit for the specific resistance $\rho$ ($\Omega$) of the glass is explained below.

If the specific resistance $\rho$ ($\Omega$) of a ferrite material is in the range of about 6–9 in the log $\rho$ unit, it is necessary to add a glass having a specific resistance greater than that of a ferrite material, in order to increase the specific resistance of a sintered ferrite body. Therefore, a glass to be added having, as a single material, a specific resistance $\rho$ ($\Omega$) of about 10 or greater in the log $\rho$ unit is used.

While it may be considered to use a glass having a specific resistance which is less than about 10 in the log $\rho$ unit but larger than that of a ferrite material, it is necessary to add a large quantity of glass in this case, in order to sufficiently improve the specific resistance of a sintered ferrite body, resulting in deterioration in the characteristics of the ferrite itself.

A glass to be added for obtaining the sintered ferrite body according to preferred embodiments of the present invention preferably also has a softening point of about 400° C. to about 700° C.

The softening point of the glass influences the sintering behavior of a ferrite, or the state of the glass portion formed on the ferrite grain boundary. If the softening point of a glass is less than about 400° C., the glass softens excessively at the time of baking for obtaining a sintered ferrite body. Thus, it is apt to be impossible to maintain the shape of a molded body which is baked to form a sintered ferrite body. On the other hand, when the softening point of a glass exceeds about 700° C., the viscosity of the glass will increase to an unnecessary extent at the time of baking for obtaining a sintered ferrite body and thus, it would be impossible to form a glass portion in an appropriately layered form on the ferrite grain boundary.

Also, according to various preferred embodiments of the present invention, a glass is added in an amount of about 0.1% to about 30% by weight with respect to a raw ferrite material.

The amount of a glass added in this range has influence on the effect of improving the specific resistance of a sintered ferrite body as well as on the sintering behavior of a sintered ferrite body. When the amount of an added glass is less than about 0.1% by weight, the specific resistance of a sintered ferrite body is not improved sufficiently, and there are occasions in which insulation deterioration occurs in the obtained laminated ferrite component. On the other hand, when the amount of the added glass is more than about 30% by weight, there are occasions in which it is impossible to maintain the shape of a molded body that is baked to form a sintered ferrite body since the glass softens at the baking step.

The effectiveness of each of the technical features of preferred embodiments of the present invention as described above was confirmed as found through specific examples described below.

In one example, in order to obtain a glass having a composition shown in Table 1, oxides, carbonates, and/or hydroxides of the components in Table 1 were mixed, melted into a vitrified state, and quenched. Next, the quenched glass was subjected to dry pulverization with a polypot mill using alumina balls as grinding balls for 16 hours.

On the other hand, so as to obtain a ferrite material as the main component, oxides having approximately 47.5 mol % of $Fe_2O_3$, 15.5 mol % of ZnO, 27.0 mol % of NiO and 10.0 mol % of CuO were prepared. They were mixed with a vibration mill, and were then subjected to calcination.

Next, a glass in an additive amount shown in Table 1 was mixed with the above-described ferrite material, and the mixture was subjected to wet pulverization in a polypot mill with alumina balls as grinding balls for 16 hours. After this, an acrylic emulsion binder was added in an amount of approximately 18% by weight with respect to the ferrite component, and mixed. Green sheets having a thickness of about 50 $\mu$m were prepared using a doctor blade method.

Next, an internal conductor in the form of a capacitor pattern was formed on the green sheets by printing them using a paste with an electroconductive component made of 100% of Ag. A plurality of green sheets were laminated and then pressed such that the internal conductors formed on the green sheets have the same configuration as that of a general-purpose laminated capacitor. The obtained laminated body was then baked in a natural atmosphere at about 930° C. for 2 hours.

The shapes of the obtained sintered bodies after the baking were evaluated. In Table 1, a good shape is represented by "O", and a defective shape is represented by "x", respectively.

Next, an Ag paste was coated on each portion on the external surfaces of a sintered body evaluated as having a good shape, where the internal conductor was exposed to the outside, and then it was baked in a natural atmosphere at about 800° C. for 30 minutes to form an external terminal electrode.

Each sample obtained in this manner and having the same structure as the laminated capacitor was subjected to a pressure-cooker test (PCT) under the conditions of a temperature of 120° C. and a relative humidity of 95% for 100 hours. A direct-current voltage of 50 V was continuously applied between the external terminal electrodes during the PCT.

After the PCT, specific resistance was determined for each of the samples. Table 1 shows numbers of defective samples out of 10 samples, in which those having a specific resistance value that is less than $10^8$ are evaluated as defective.

TABLE 1

| Sample No. | Specific resistance of glass log ρ (Ω) | Softening point (° C.) | Amount of added glass (wt %) | Components of glass (wt %) | | | | | | | | | | | Number of defective parts in PCT (n = 10) | Shape after the baking |
|---|---|---|---|---|---|---|---|---|---|---|---|---|---|---|---|---|
| | | | | Si | B | Al | Ti | Zn | Pb | Cu | Ca | K | Ba | Bi | | |
| 1 | 9.3 | 511 | 5 | 8 | 0 | 0 | 0 | 2 | 0 | 17 | 0 | 0 | 0 | 73 | 10 | ○ |
| 2 | 16.0 | 820 | 5 | 79 | 19 | 0 | 0 | 0 | 0 | 0 | 0 | 2 | 0 | 0 | 9 | ○ |
| 3 | 14.7 | 752 | 5 | 60 | 23 | 0 | 0 | 0 | 0 | 0 | 0 | 17 | 0 | 0 | 4 | ○ |
| 4 | 14.0 | 700 | 5 | 70 | 17 | 0 | 0 | 8 | 5 | 0 | 0 | 0 | 0 | 0 | 0 | ○ |
| 5 | 13.2 | 677 | 5 | 42 | 44 | 0 | 0 | 0 | 10 | 4 | 0 | 0 | 0 | 0 | 0 | ○ |
| 6 | 10.0 | 572 | 5 | 11 | 0 | 0 | 7 | 12 | 0 | 20 | 10 | 0 | 0 | 40 | 0 | ○ |
| 7 | 11.9 | 440 | 5 | 3 | 11 | 11 | 0 | 0 | 75 | 0 | 0 | 0 | 0 | 0 | 0 | ○ |
| 8 | 11.2 | 400 | 5 | 11 | 7 | 0 | 0 | 0 | 82 | 0 | 0 | 0 | 0 | 0 | 0 | ○ |
| 9 | 11.1 | 372 | 5 | 0 | 8 | 0 | 0 | 0 | 75 | 0 | 0 | 0 | 7 | 10 | — | ◇ |
| 10 | — | — | 0 | — | — | — | — | — | — | — | — | — | — | — | 10 | ○ |
| 11 | 11.9 | 440 | 0.1 | 3 | 11 | 11 | 0 | 0 | 75 | 0 | 0 | 0 | 0 | 0 | 0 | ○ |
| 12 | 11.9 | 440 | 1 | 3 | 11 | 11 | 0 | 0 | 75 | 0 | 0 | 0 | 0 | 0 | 0 | ○ |
| 13 | 11.9 | 440 | 10 | 3 | 11 | 11 | 0 | 0 | 75 | 0 | 0 | 0 | 0 | 0 | 0 | ○ |
| 14 | 11.9 | 440 | 30 | 3 | 11 | 11 | 0 | 0 | 75 | 0 | 0 | 0 | 0 | 0 | 0 | ○ |
| 15 | 11.9 | 440 | 40 | 3 | 11 | 11 | 0 | 0 | 75 | 0 | 0 | 0 | 0 | 0 | — | ◇ |

In Table 1, the samples 4–8 and 11–14 correspond to preferred embodiments of the present invention, and the samples 1–3, 9, 10, and 15 correspond to the comparative examples prepared for comparison to preferred embodiments of the present invention.

As is indicated in Table 1, samples 4–8 and 11–14 which included the features of preferred embodiments of the present invention show excellent results in both the PCT and the shapes after baking.

On the other hand, in sample 1 which did not include the features of preferred embodiments of the present invention, the specific resistance of the added glass was about 9.3 which was less than 10 in the log ρ unit. This specific resistance is not enough to increase the specific resistance of the sintered ferrite body. Thus, the number of defective parts was 10 in the PCT, indicating that it was susceptible to insulation deterioration.

Also, when the softening point of the added glass exceeded 700° C. as were in samples 2 and 3, defects occurred in some of the samples in the PCT, indicating that it was not possible to achieve an improved specific resistance enough to prevent insulation deterioration in the sintered ferrite body, since it was difficult to form an appropriately layered glass portion on the ferrite grain boundary.

Also sample 9 shows a result that the softening point of the added glass was less than about 400° C., and therefore it was not possible to maintain the shape of the molded body which was baked to form the sintered ferrite body. As a result, the shape after the baking was not good.

In sample 7 and samples 11–15, the specific resistances and the softening points of the glasses were substantially the same among these samples. However, the amounts of the added glasses were different from each other. Glass was not added in sample 10.

From the comparison of these samples 7 and 10–15, it is understood that the additive amount of glass to be added is preferably in the range of about 0.1 by weight to about 30% by weight. Sample 10 having no added glass indicated no improved specific resistance in the sintered ferrite body, and shows 10 defective parts in the PCT. On the other hand, in sample 15 having about 40% by weight of the added glass, well in excess of 30% by weight, the results show that it was not possible to maintain the shape of the molded body which was baked to form the sintered ferrite body during the baking step, and thus, the shape after the baking was defective.

As explained above, a sintered ferrite body according to various preferred embodiments of the present invention is obtained by baking a raw ferrite material and a glass which is added to the raw ferrite material, the content of the glass is about 0.1% by weight to about 30% by weight, and the glass has a specific resistance ρ (Ω) of about 10 or greater in the log ρ unit, and a softening point of approximately 400° C. to 700° C. Therefore, it is possible to form an appropriately layered glass portion on the ferrite grain boundary, to greatly improve the specific resistance of the sintered ferrite body as a whole, and also to reliably and accurately maintain the shape of a molded body which is baked to form the sintered ferrite body in the baking step.

Therefore, when constructing a laminated ferrite component using this sintered ferrite body, the insulation deterioration and the migration of the internal electrode are prevented from occurring in this laminated ferrite component. Accordingly, it is possible to apply an internal conductor containing silver to a laminated ferrite component without any problem.

It should be understood that the foregoing description is only illustrative of the present invention. Various alternatives and modifications can be devised by those skilled in the art without departing from the invention. Accordingly, the present invention is intended to embrace all such alternatives, modifications and variations which fall within the scope of the appended claims.

What is claimed is:

1. A sintered ferrite body comprising:
   a glass portion located at a ferrite grain boundary, the body being baked and including a raw ferrite material and a glass which is added to the raw ferrite material;
   wherein the content of the glass is about 0.1% by weight to about 30% by weight with respect to the raw ferrite material, and the glass has, as a single material, a specific resistance ρ (Ω) of about 10 or greater in the log ρ unit, and a softening point of about 400° C. to about 700° C.; and
   the body includes an internal conductor which comprises silver or a silver alloy.

2. A sintered ferrite body according to claim 1, wherein said ferrite is one of an Ni system, an Ni—Zn system, and an Ni—Cu—Zn system ferrite.

3. A sintered ferrite body according to claim 1, wherein the ferrite material includes oxides having approximately 47.5 mol % of $Fe_2O_3$, 15.5 mol % of ZnO, 27.0 mol % of NiO and 10.0 mol % of CuO.

4. A laminated ferrite component comprising:
a sintered ferrite body having a glass portion located at a ferrite grain boundary, the body being baked and including a raw ferrite material and a glass which is added to the raw ferrite material, wherein the content of the glass is about 0.1% by weight to about 30% by weight with respect to the raw ferrite material, and the glass has, as a single material, a specific resistance $\rho(\Omega)$ of about 10 or greater in the log $\rho$ unit, and a softening point of about 400° C. to about 700° C.; and
an internal conductor comprising silver or a silver alloy and located inside said sintered ferrite body.

5. A method of forming a sintered ferrite body comprising the steps of:
providing a ferrite material;
adding a glass powder and mixing the glass powder with the ferrite material to produce a slurry;
placing a silver or silver alloy conductor coil inside a mold:
filling the mold with the slurry of the glass powder and the ferrite material;
pressing the slurry and the conductor coil to form a sintered ferrite; and
baking the molded member and the silver or silver alloy; wherein
the content of the glass is about 0.1% by weight to about 30% by weight with respect to the ferrite material, and the glass has, as a single material, a specific resistance $\rho(\Omega)$ of about 10 or greater in the log $\rho$ unit, and a softening point of about 400° C. to about 700° C.

6. The method according to claim 5, wherein the glass powder is made of melting glass into a vitrified material during a heat treatment and pulverizing the resulting vitrified material.

7. The method according to claim 5, wherein the ferrite material is formed by mixing oxides having approximately 47.5 mol % of $Fe_2O_3$, 15.5 mol % of ZnO, 27.0 mol % of NiO and 10.0 mol % of CuO.

8. The method according to claim 5, further comprising the step of subjecting the mixture of the ferrite material and the glass powder to wet pulverization in a polypot mill with grinding balls for 16 hours prior to forming the slurry.

9. The method according to claim 5, further comprising the step of adding to the glass powder and the ferrite material, an acrylic emulsion binder in an amount of approximately 18% by weight with respect to the ferrite component, and mixing the acrylic emulsion binder with the mixture of the ferrite material and the glass powder to produce the slurry.

10. A sintered ferrite body according to claim 1, wherein said glass includes at least one of Cu, K, Ca and Ba.

11. A laminated ferrite component according to claim 4, wherein said glass includes at least one of Cu, K, Ca and Ba.

12. A method of forming a sintered ferrite body according to claim 5, wherein said glass powder includes at least one of Cu, K, Ca and Ba.

13. A method of forming a sintered ferrite body comprising the steps of:
providing a ferrite material;
adding a glass powder and mixing the glass powder with the ferrite material to produce a slurry;
forming a plurality of sheets from the slurry including the ferrite material and the glass powder;
providing silver or silver alloy on at least one of the plurality of sheets;
laminating the plurality of sheets; and
baking the plurality of sheets and the silver or silver alloy; wherein
the content of the glass is about 0.1% by weight to about 30% by weight with respect to the ferrite material, and the glass has, as a single material, a specific resistance $\rho(\Omega)$ of about 10 or greater in the log $\rho$ unit, and a softening point of about 400° C. to about 700° C.

14. The method according to claim 13, wherein the glass powder is made by meting glass into a vitrified material during a heat treatment and pulverizing the resulting vitrified material.

15. The method according to claim 13, wherein the silver or a silver alloy forms a conductor on at least one of the plurality of sheets.

16. The method according to claim 13, further comprising the step of press-molding the plurality of sheets.

17. The method according to claim 16, wherein the silver or a silver alloy forms a conductor coil to be used as an internal conductor and the step press-molding the plurality of sheets includes the steps of filling a press mold with the plurality of sheets and pressing the conductor coil and the plurality of sheets.

18. The method according to claim 13, wherein the ferrite material is formed by mixing oxides having approximately 47.5 mol % of $Fe_2O_3$, 15.5 mol % of ZnO, 27.0 mol % of NiO and 10.0 mol % of CuO.

19. The method according to claim 13, further comprising the step of subjecting the mixture of the ferrite material and the glass powder to wet pulverization in a polypot mill with grinding balls for 16 hours prior to forming the slurry.

20. The method according to claim 13, further comprising the step of adding to the glass powder and the ferrite material, an acrylic emulsion binder in an amount of approximately 18% by weight with respect to the ferrite component, and mixing the acrylic emulsion binder with the mixture of the ferrite material and the glass powder to produce the slurry.

21. The method according to claim 20, wherein the step of forming a plurality of sheets includes forming the plurality of green sheets from the mixture of the ferrite material, the glass powder and the acrylic emulsion using a doctor blade, the plurality of sheets each having a thickness of about 50 $\mu$m.

22. The method according to claim 21, wherein the step of providing silver or a silver alloy includes the step of forming an internal conductor in the form of a capacitor pattern on the plurality of green sheets via printing using a paste with an electroconductive component comprising the silver or the silver alloy.

23. The method according to claim 22, further comprising the step of pressing the laminated body such that the internal conductors formed on the plurality of green sheets form a component body.

24. The method according to claim 23, further comprising the step of baking the sintered ferrite body at about 930° C. for 2 hours.

25. A method of forming a sintered ferrite body according to claim 13, wherein said glass powder includes at least one of Cu, K, Ca and Ba.

* * * * *